(12) United States Patent
Bourdillon

(10) Patent No.: US 6,606,257 B2
(45) Date of Patent: Aug. 12, 2003

(54) INDEPENDENT REGULATION OF MULTIPLE OUTPUTS IN A SOFT-SWITCHING MULTIPLE-OUTPUT FLYBACK CONVERTER

(75) Inventor: Laurence Bourdillon, New Milford, CT (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/993,060

(22) Filed: Nov. 5, 2001

(65) Prior Publication Data

US 2003/0086280 A1 May 8, 2003

(51) Int. Cl.[7] .............................................. H02M 3/335
(52) U.S. Cl. ..................... 363/21.12; 363/131
(58) Field of Search ................. 363/20, 21.01, 363/21.12, 21.13, 21.14, 21.18, 131

(56) References Cited

U.S. PATENT DOCUMENTS

| | | | |
|---|---|---|---|
| 5,539,630 A | 7/1996 | Pietkiewicz et al. | 363/17 |
| 5,663,874 A | 9/1997 | Mader et al. | 363/21 |
| 6,069,804 A | * 5/2000 | Ingman et al. | 363/21.12 |
| 6,078,509 A | 6/2000 | Jacobs et al. | 363/21 |
| 6,104,623 A | 8/2000 | Rozman | 363/21 |
| 6,130,828 A | 10/2000 | Rozman | 363/21 |
| 6,201,719 B1 | * 3/2001 | He et al. | 363/72 |

\* cited by examiner

*Primary Examiner*—Adolf Deneke Berhane
(74) *Attorney, Agent, or Firm*—Edward W. Goodman

(57) ABSTRACT

A soft-switching multiple output fly-back converter provides output cyclying sequence control. Each of the multiple output circuits includes a bi-directional switching circuit which provides for flexible reconfiguration of the output cycling sequence. Further, the novel circuit allows each of the individual outputs, or any combination thereof, to be independently turned 'off' (i.e., removed from the cycling sequence) and re-introduced (i.e., turned 'on' again) at a later time as needed.

14 Claims, 6 Drawing Sheets

INDEPENDENT REGULATION OF MULTIPLE OUTPUTS IN A SOFT-SWITCHING MULTIPLE-OUTPUT FLYBACK CONVERTER

BACKGROUND OF THE INVENTION

1. Field of the Invention

The present invention is directed, in general, to the field of DC-to-DC converters. More particularly, the present invention relates to a multiple-output flyback converter having an improved energy cycle sequencing capability.

2. Description of The Related Art

Conventional flyback switching power supplies commonly include a pair of transformers (actually a pair of coupled inductors) and one or more power switches for alternately coupling an unregulated DC or rectified AC voltage across a primary winding of the power transformer in a series of voltage pulses. These pulses are converted into a series of voltage pulses across one or more secondary windings of the power transformer and then rectified and filtered to provide one or more output DC voltages. The output voltage or voltages of the power converter are commonly regulated by controlling the relative amount of time that the power switch is 'on' (i.e., the duty cycle).

One common type of switching power supply is the flyback power converter, which is an isolated version of the buck-boost converter. The flyback converter is a very popular power supply topology for use in low-power, multiple-output applications. A flyback power converter works by cyclically storing energy in the power transformer, and then dumping this stored energy into a load. By varying the amount of energy stored and dumped per cycle, the output power can be controlled and regulated. A high-power switching transistor connected in series with the primary winding of the power transformer normally provides such a switching function. That is, the on-time and off-time of this power switch controls the amount of energy coupled across the power transformer. When the power switch is 'on', current flows through the primary winding of the power transformer, and energy is stored in the transformer (primary magnetizing inductance). When the power switch is 'off', the stored energy is transferred out into a secondary circuit by means of current flowing out of one or more secondary windings of the power transformer. Note that the secondary current does not flow in the power transformer at the same time that the power switch is 'on' and the primary current is flowing. The reason for this is that in a conventional flyback power converter, the winding polarity is chosen and a rectifier is coupled to the secondary winding to prevent conduction of current in the secondary winding when the power switch is 'on'.

Flyback power converters are advantageous at lower power levels over other switching power converters due to the fact that they are generally simpler, they require a reduced number of components, and they allow multiple regulated outputs to be available from a single supply. Common applications for flyback converters are AC adapters, which may, for example, deliver an output voltage in the range of between 9 VDC to 180 VDC at power levels of 20 to 100 Watts, drawing power from a rectified AC line voltage, which may vary between 85 VAC to 270 VAC for universal line voltage inputs.

Flyback converters are generally operated in one of two modes. A first mode of operation, referred to as the Discontinuous Conduction Mode (DCM), is well known in the art, in which the energy stored in the transformer is totally coupled to the output load before the next energy cycle, generally resulting in the secondary current reaching zero before the next drive cycle. The second mode of operation is referred to as the Continuous Conduction Mode (CCM), whereby the next energy cycle begins before all stored magnetic energy is released from the transformer, and, therefore, before the secondary current reaches zero. DCM is more common than CCM because relatively simple control circuitry can be used to maintain output voltage regulation by varying the frequency and/or on-time of the power switch to accommodate heavy or light load conditions.

FIG. 1 illustrates a conventional flyback converter 100 which may be operated in either DCM or CCM. One disadvantage of the flyback converter 100 is that when operated in the CCM, the flyback converter 100 may exhibit potentially unstable operation when used with high bandwidth feedback loops. That is, the converter 100 is susceptible to oscillations when high bandwidth feedback loops are used. Another disadvantage of this circuit topology is that the diode $D_1$ is hard-switched. That is, in the CCM, current is reversed while the diode $D_1$ is still conducting.

FIG. 2 is an illustration of another conventional flyback DC-DC converter whose topology is similar to that illustrated in FIG. 1 except for diode $D_1$ being replaced by switch $S_1$. In the circuit of FIG. 2, the body diode of switch $S_1$ provides the same functionality as the diode $D_1$ of the circuit of FIG. 1. The circuit of FIG. 2 functions in the same manner as the circuit of FIG. 1 when switch $S_1$ is held 'off'. However, when switch $S_1$ is turned 'on', bi-directional current flow is enabled. That is, current can flow in the reverse direction (i.e., out of the filter capacitor $C_1$ through the secondary winding, nS1).

FIG. 3a is an illustration of another prior art flyback converter 310 having multiple output circuits 311, 313. Each of the respective output circuits 311, 313 includes a blocking diode ($D_1$, $D_2$) and a unidirectional switch ($S_1$, $S_2$). If the unidirectional switch $S_1$ is in the 'off' state, then current is blocked from flowing into the output. Therefore, the 'on' time of switch $S_1$ controls the power flow to the output of circuit 311.

A drawback of circuit 310 is that when the circuit operates in the discontinuous conduction mode, it is necessary to drain the transformer T of energy in each cycle. This may be problematic in that the unidirectional switch associated with the last or final output circuit in the switching cycle (e.g., switch $S_2$) has to remain 'on' for a long enough time to fully drain the transformer T in each switching cycle. To ensure that this occurs, in actual practice, switch $S_2$ is often eliminated.

FIG. 3b is an illustration of the circuit of FIG. 3a which eliminates circuit switch $S_2$. As discussed above, this ensures that the transformer T will be fully drained in each switching cycle. Elimination of switch $S_2$ causes output $V_2$ to be controlled solely by the 'on' time of the primary switch $S_M$.

FIGS. 3a and 3b illustrate circuits having two output circuits. Irrespective of the number of output circuits, however, primary side control of the final output circuit occurs. In each case, in DCM, the last output circuit would be controlled by the 'on' time of the primary switch $S_M$. It may be desirable, in certain cases, to retain the output circuit switch in the last output circuit even though the output is effectively controlled by the 'on' time of the primary switch. This is true because retaining the switch enables the implementation of synchronous rectification and primary soft-switching.

FIG. 4 is an illustration of another prior art circuit topology, which is a modification of the circuit topology of FIG. 3b. The circuit of FIG. 4 includes a switch $S_2$ in place of blocking diode $D_2$ of the circuit of FIG. 3b. The circuit topology of FIG. 4 provides advantages over the topologies of FIG. 3b in that the bi-directional switch $S_2$ permits synchronous rectification and further permits bi-directional soft switching of primary switch $S_M$. However, even though the illustrative prior art topology of FIG. 4 enables synchronous rectification and soft switching, it shares the drawback or restriction, common to all the prior art circuits illustrated, in that the last output (e.g., output $V_2$ in FIG. 4) has to be cycled last in each energy cycle. From a control or circuit standpoint, this restriction may not always be desirable.

This restriction exists by virtue of the circuit topology. In particular, the cycling restriction exists because switch $S_2$ of output circuit 413 has no forward blocking capability. As a consequence of the lack of forward blocking capability, voltage $V_2$ of output circuit 413 must be maintained at a higher voltage than $V_1$ so as to reverse bias the body diode of switch $S_2$ to compensate for the lack of forward blocking capability. By contrast, output circuit 411 provides a forward blocking capability and can therefore be cycled at any point in the cycling sequence. The forward blocking capability is provided by the internal body diode of switch $S_1$.

SUMMARY OF THE INVENTION

It is therefore an object of the present invention to provide an improved multiple output power converter capable of providing soft-switching and being further capable of sequencing the outputs in any order without restriction.

A primary objective of this invention is to provide a DC-to-DC flyback converter having an easily reconfigurable output cycle sequencing capability.

Yet another objective is to provide a DC-to-DC flyback converter which enables simultaneous soft switching of primary and secondary side switches.

A still further objective is to provide a DC-to-DC flyback converter which avoids diode drop losses in low voltage, high current supplies.

Another objective is to provide a DC-to-DC flyback converter having an easily reconfigurable circuit configuration for applications involving power down.

A still further objective is to implement the secondary side switches as current bi-directional switches, such as MOSFET'S, thus providing an output cycling reconfiguration capability.

These and other objects of the invention are achieved in a multiple-output flyback converter. The flyback converter circuit of the present invention includes multiple output circuits, each having a bi-directional switch which provides for flexible reconfiguration of the output cycling sequence. Further, the novel circuit allows each of the individual outputs, or any combination thereof, to be independently turned 'off' (i.e., removed from the cycling sequence) and re-introduced (i.e., turned 'on' again) at a later time as needed.

The flyback converter circuit according to the present invention includes a power transformer, a primary side switch and multiple output channels or circuits, each output circuit including a voltage controlled bi-directional switch permitting each output channel to be driven independently and, therefore, capable of being cycled in any order during a time the primary switch is turned 'off'. By providing a bi-directional switch in each output channel, any restrictions on the sequencing of the respective output channels are removed. That is, each output channel can be cycled in any order with limited restrictions while still maintaining synchronous rectification and soft-switching available with bi-directional action.

Advantages of the present invention include simultaneous soft-switching of the primary-side and secondary-side switches, and higher circuit efficiency as a consequence of using bi-directional switches in the output circuits instead of diodes resulting in lower circuit losses especially in low-voltage, high current applications.

DESCRIPTION OF THE PREFERRED EMBODIMENTS

It is noted that while each of the embodiments of the present invention described herein use a single output winding with multiple outputs on the single output winding, each output could alternatively be placed on a separate dedicated output winding without altering the operation/control of the inventive circuits. It is noted that in those cases where it is more desirable to use multiple output windings, (e.g., electrical isolation requirements), the reflected voltage (i.e., output voltage multiplied by the turns ratio) will determine the most desirable cycling sequence. In the case of a single output winding, to maintain soft-switching of the output switches, the chosen output switching or cycling sequence is usually from the lowest voltage output to the highest. However, in the case of multiple output windings, to maintain soft-switching, the lowest to highest voltage sequence is determined by the reflected voltages (i.e., output voltages multiplied by the respective turns ratio of the particular output winding).

Figure 5:
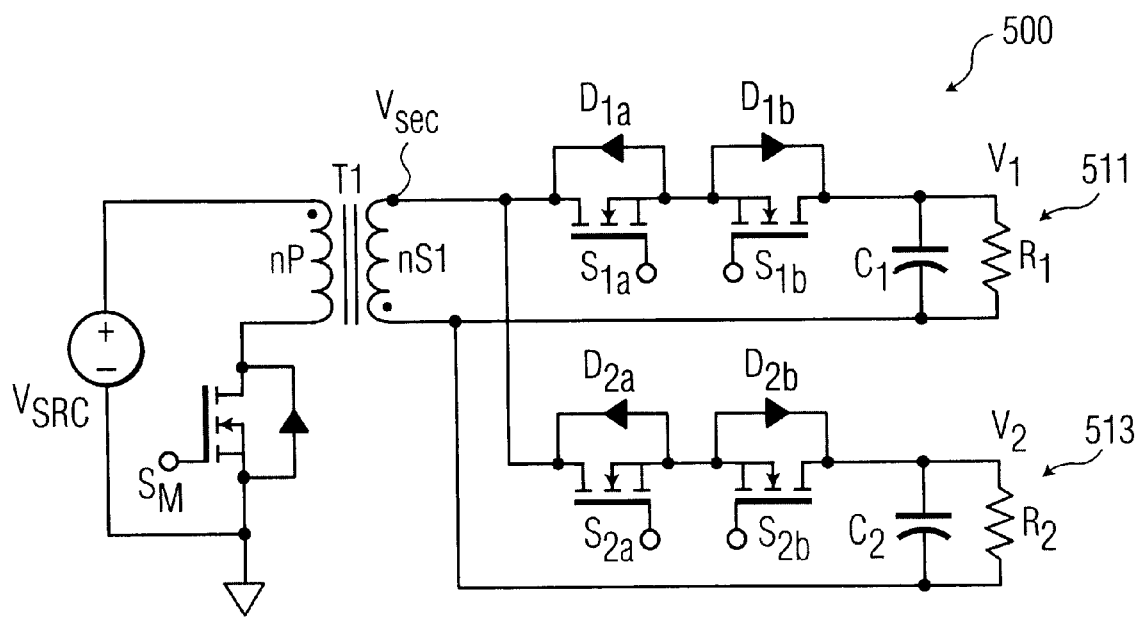
FIG. 5 is a circuit diagram of a soft-switching multiple-output flyback converter in accordance with the present invention.

Referring to FIG. 5, an exemplary flyback converter circuit 500 according to the present invention is shown. The converter 500 includes a bi-directional switch in each of the respective output circuits 511, 513. A bi-directional switch is a switch (or pair of switches) that can conduct current flow in either direction and can also block current flow from either direction. While only two output circuits 511, 513 are shown in the exemplary embodiment, other embodiments may include a greater or lesser number of output circuits.

As shown in FIG. 5, the bi-directional switches are respectively made up of sub-switches ($S_{1a}$, $S_{1b}$) and ($S_{2a}$, $S_{2b}$). Each sub-switch may be independently controlled by applying appropriate control logic to provide a circuit reconfiguration capability not available in prior art circuit configurations.

By utilizing a bi-directional switch in each output circuit, the circuit 500 is reconfigurable in two aspects. First, any of the output circuits (e.g., 511, 513) are capable of being independently turned 'on' or 'off'. By turning a particular output circuit 'off', it is effectively removed from the circuit 500 until such time as it is turned 'on' again. However, given this capability, it should be understood that the inventive circuit 500 allows for a situation in which all output circuits are turned 'off' simultaneously. While this is easily achieved, it is an undesirable situation for a fly-back configuration. Second, the output cycling sequence may be easily reconfigured (e.g., 511, 513 or 513, 511) by applying appropriate control logic to the respective bi-directional switches. These features will be described in greater detail below.

By utilizing bi-directional switches in the respective output circuits of the circuit 500 of FIG. 5, the limitation of requiring a particular output circuit to by cycled last is removed. This is true because, unlike the circuit topology of FIG. 4, for example, which does not provide a forward blocking capability in each of the respective output circuits, the inventive circuit 500 provides such a capability in each circuit which allows for any desired cycling order. Further, once a particular cycling order is chosen, it can be easily changed to a different cycling order to emulate other prior art circuit configurations by simply modifying the control logic of the gates which control the bi-directional switches $S_{1a}/S_{1b}$, $S_{2a}/S_{2b}$ in the respective output circuits.

A few representative examples of how the inventive circuit 500 may be used to emulate prior art circuit configurations while removing the cycling order limitation are provided below.

FIRST EXAMPLE

An example of how the inventive circuit 500 may be easily reconfigured to emulate prior art circuitry will now be described with reference to the prior art circuit of FIG. 4. It is noted that the circuit 500 is not only capable of emulating the prior art circuit configuration, i.e., circuit 400, but moreover, does so without incurring the aforementioned limitation of requiring a particular cycling order.

Emulation of prior art circuit 400 is generally achieved by the inventive circuit 500 by emulating each component of the respective output circuits of prior art circuit 400. More particularly, output circuit 511 must be configured in such a way as to emulate prior art circuit 411. Similarly, output circuit 513 must be configured in such a way as to emulate prior art output circuit 413.

Prior art output circuit 411 is emulated by output circuit 511 in the following manner. Maintaining sub-switch $S_{1b}$ of circuit 511 to be permanently 'off' enables sub-switch $S_{1a}$ to emulates switch $S_1$ of output circuit 411, while sub-switch $S_{1b}$ emulates diode $D_1$ of output circuit 411.

Similarly, prior art output circuit 413 is emulated by output circuit 513 by maintaining sub-switch $S_{2a}$ of circuit 513 to be permanently 'on', sub-switch $S_{2b}$ thereby emulating switch $S_2$.

Figure 1:
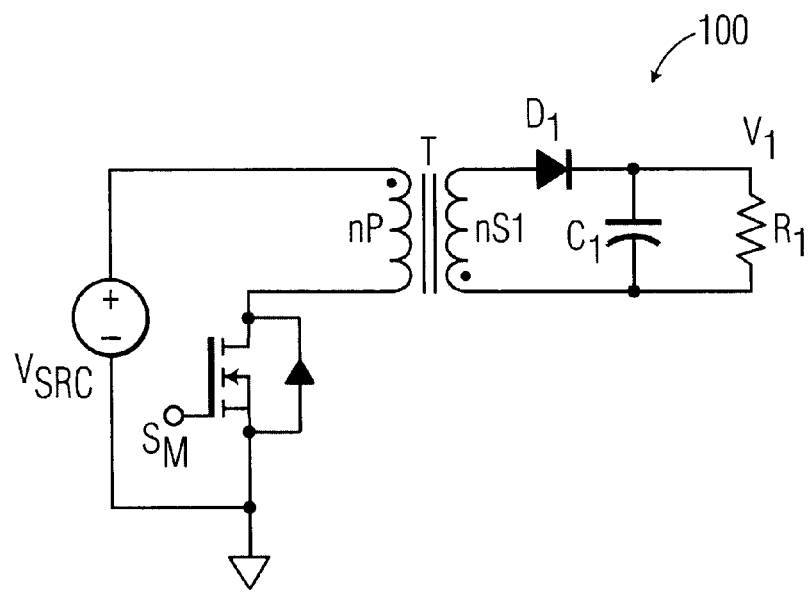
FIG. 1 is a circuit diagram of a prior art flyback converter.
Figure 2:
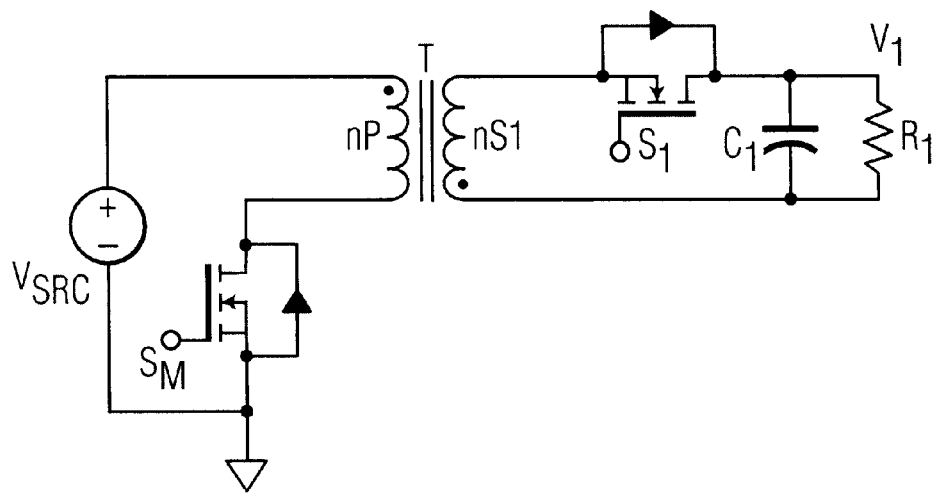
FIG. 2 is a circuit diagram of another prior art flyback converter.
Figure 3A:
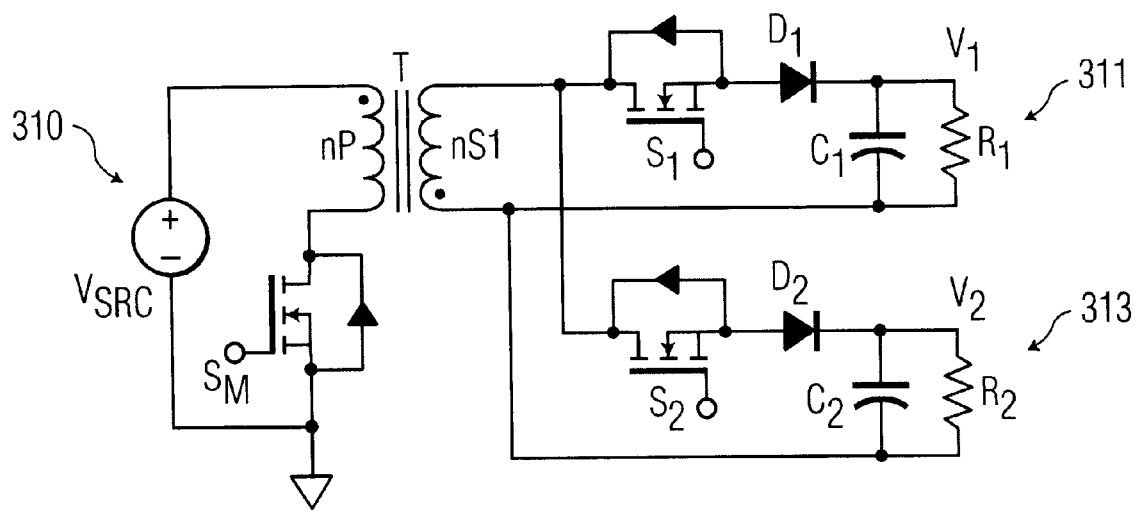
FIG. 3a is a circuit diagram of another prior art flyback converter having multiple output circuits.
Figure 3B:
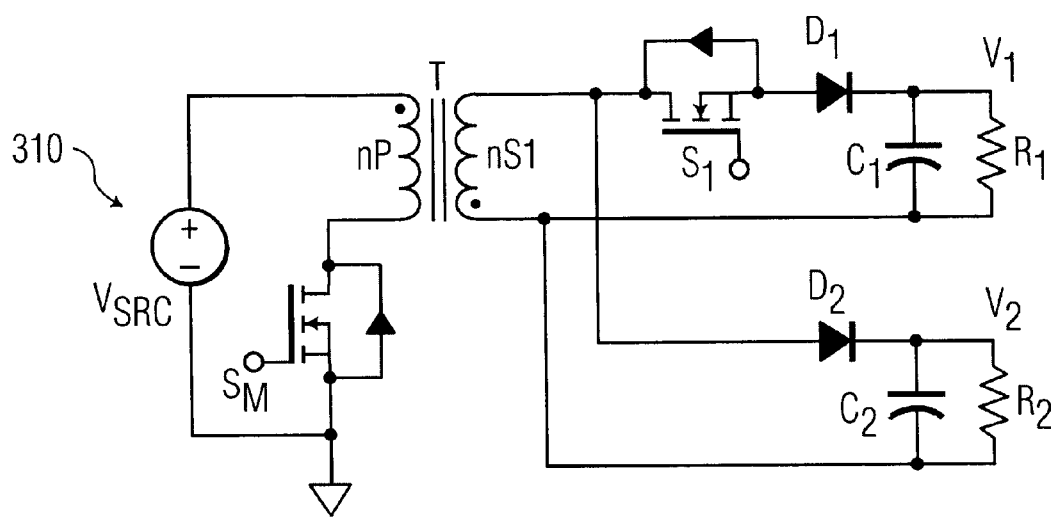
FIG. 3b is a modified circuit diagram of FIG. 3b.
Figure 4:
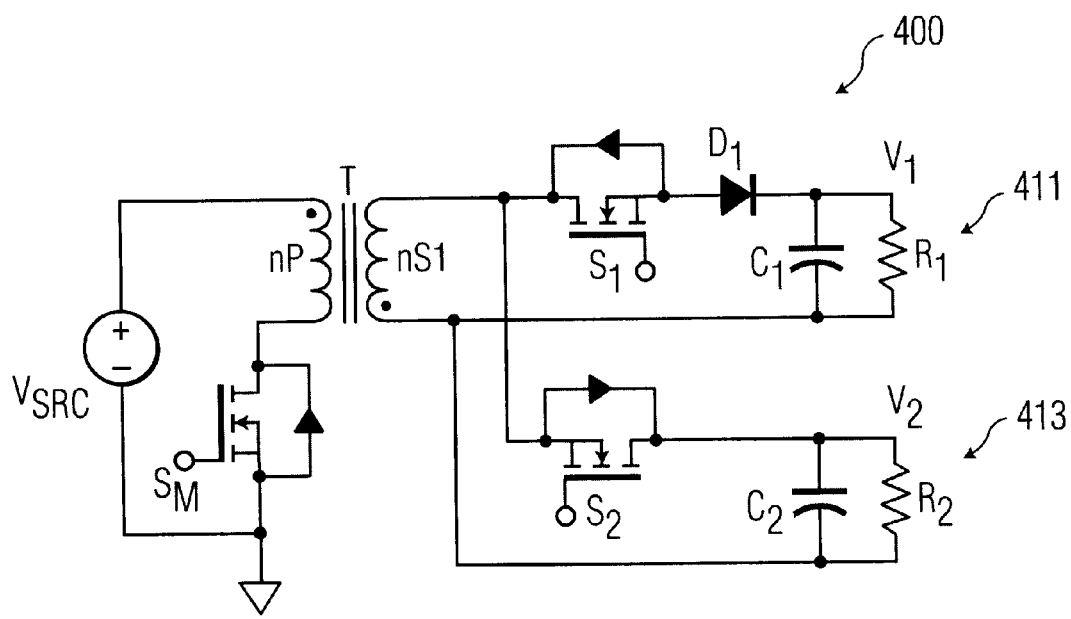
FIG. 4 is a circuit diagram of a prior art flyback converter which combines elements of the circuit topology of FIG. 3b.

It is therefore shown that by properly configuring the respective bi-directional switches of the inventive circuit 500, the prior art output circuit configuration of FIG. 4 is emulated. Moreover, the inherent limitation of prior art configuration circuit 400 is overcome by using bi-directional switches, $S_{1a}/S_{1b}$, $S_{2a}/S_{2b}$ in lieu of the conventional circuit components of the prior art, thereby providing a forward blocking capability in each output which allows for any desired cycling order without restriction.

SECOND EXAMPLE

As an example of the ease with which the cycling order can be modified or changed, the present example illustrates what is required to reverse the cycling order of the previous example. Namely, cycling output circuit 513 first followed by output circuit 511. This is achieved as follows.

Prior art output circuit 411 is emulated by output circuit 513 by maintaining switch $S_{2b}$ of output circuit 513 to be permanently 'off'. Prior art output circuit 413 is emulated by output circuit 511 by maintaining switch $S_{1a}$ of output circuit 511 to be permanently 'on'.

SOFT-SWITCHING

Another feature of the present invention is that simultaneous soft-switching of the primary and secondary side switches is maintained.

The secondary switches illustrated in FIG. 5 are preferably implemented as NMOS switches. These switches have two conduction paths, one is the main channel, which is controlled by the gate voltage. When the gate voltage is 'on' (i.e., 12V or so with respect to the source) the channel is 'on' and current can flow in either direction through the main switch channel. The voltage drop (in either direction) across the switch, while the channel is 'on', will be the current times the RDSon resistance. When the gate is 'off', the channel will no longer conduct. However, the parasitic (body) diode will conduct if the voltage in the diode forward direction (i.e., source-to-drain) exceeds 0.7V or so. The body diode drop will always be this 0.7V. The RDSon drop can be made arbitrarily small simply by using a larger (lower RDSon) switch. However, using a larger switch incurs an associated higher cost.

FIGS. 6A–6E are idealized circuit waveforms for illustrating how soft-switching is achieved by the inventive circuit 500.

Figure 6A:
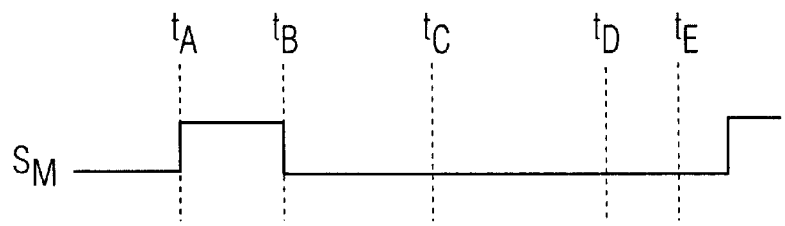
FIGS. 6A–6E illustrate idealized waveforms during a switching period of the soft-switched multiple-output flyback converter of FIG. 5.
Figure 6B:
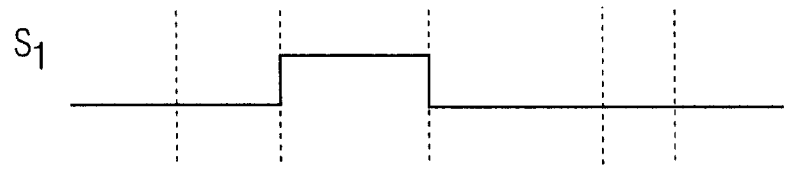
Figure 6C:
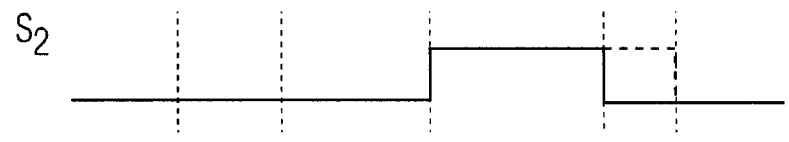
Figure 6D:
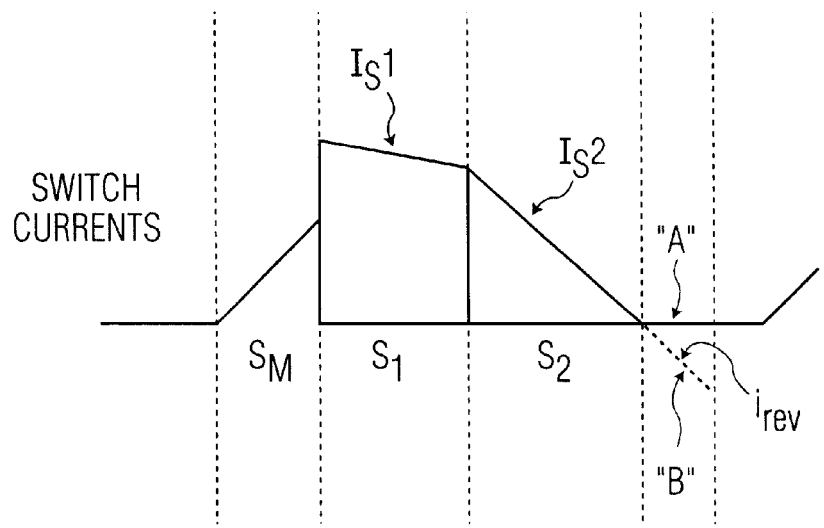

FIGS. 6A–6C illustrate the open and closed states of the switches $S_{1a}/S_{1b}$ and $S_{2a}/S_{2b}$ during one inductor charge/discharge cycle depicted at the time instants $t_A$ to $t_E$. In FIG. 6A, while primary side switch $S_M$ is closed, the isolation transformer T1 is in a charging phase depicted as the time period $t_A$ to $t_B$. During the time period $t_B$ to $t_E$, the primary switch $S_M$ is open and the isolation transformer T1 is in a discharging phase.

At the time instant $t_B$, the start of the discharge phase, the switch $S_M$ changes to an open state (see FIG. 6A) and switch $S_{1a}/S_{1b}$ changes to a closed state (see FIG. 6B).

For the time period $t_B$ to $t_C$, the switch $S_{1a}/S_{1b}$ remains closed (see FIG. 6B). Switch current Is1 (see FIG. 6D) flows in switch $S_{1a}/S_{1b}$ to output $V_1$ for a predetermined (i.e., feedback control) amount of time which results in power being delivered to the load R1 being charged.

For the time period $t_C$ to $t_D$, the switch $S_{2a}/S_{2b}$ is in a closed state (see FIG. 6C), and the switch $S_{1a}/S_{1b}$ is in an open state (see FIG. 6B). During this time, current Is2 (see FIG. 6D) flows through the channel of $S_{2a}/S_{2b}$ to output $V_2$ which results in power being delivered to the load R2 being charged.

Figure 6E:
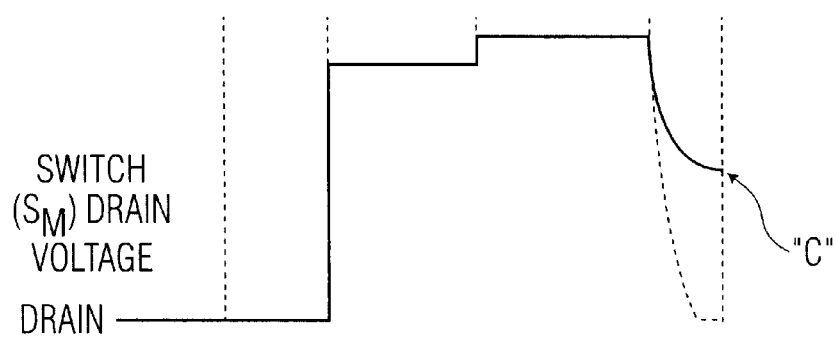

FIG. 6E illustrates two alternative situations concerning the state of switch $S_{2a}/S_{2b}$ at time instant $t_D$. In the first situation, switch $S_{2a}/S_{2b}$ is turned 'off' at time $t_D$ (see "A") and in the second situation, switch $S_{2a}/S_{2b}$ is maintained in an 'on' state. Both situations are described below.

In the first situation, switch $S_{2a}/S_{2b}$ is turned 'off' (see "A") ceasing current flow when the body diode of switch $S_{2a}/S_{2b}$ becomes reversed biased at time instant $t_D$.

At time instant $t_D$, the primary switch drain voltage, $V_{drain}$, will fall but may never reach zero volts before the next switching cycle (see point C in FIG. 6E). When the primary switch $S_M$ is turned 'on' again at the start of the next energy cycle, there will, in most cases, be some residual voltage across the primary switch $S_M$, in which case hard-switching will result from the discharge of the parasitic capacitance of $S_M$ through the switch itself. The parasitic capacitance represents the sum of the primary switch capacitance, the reflected secondary switch capacitance and any stray capacitances in the transformer, wiring, etc.

A residual voltage occurs at point A as a function of both the reflected voltage from the secondaries and the line or input voltage. That is, certain combinations (i.e., subtracting one from another) of line voltage and reflected voltage results in a zero or near zero voltage, while other combinations results in a non-zero 'residual' voltage. Bi-directional flyback action, which is well known in the art, ensures that for any combination of line input voltage and secondary reflected voltage, soft-switching (i.e., a zero or near zero voltage at the primary) is achieved.

In the second situation, soft-switching of the primary switch $S_M$ is achieved by maintaining bi-directional switch $S_{2a}/S_{2b}$ in an 'on' state (see "B") to permit a reverse current, $I_{rev}$, to flow through the switch for a time period $t_D$ to $t_E$. That is, switch $S_{2a}/S_{2b}$, being a bi-directional switch, is capable of conducting a reverse current by remaining 'on' for an extended time ( i.e., time period $t_D$ to $t_E$) beyond its normal ON time (i.e., time period $t_C$ to $t_D$). For the time period $t_D$ to $t_E$, some current will flow out of the capacitor C2 back to the secondary winding nS1. During this time, the parasitic capacitance of switch $S_{2a}/S_{2b}$ is discharged thereby enabling soft-switching of secondary side switch $S_{2a}/S_{2b}$. When $S_{2a}/S_{2b}$ is turned 'off' at time instant $t_E$, the parasitic capacitance of the primary power switch $S_M$ will be discharged through a reverse flyback action, thereby bringing the drain voltage of $S_M$ to substantially zero volts, thus enabling soft-switching of the primary switch $S_M$.

By utilizing bi-directional switches in each of the respective output circuits of the inventive circuit 500, soft-switching of both the primary switch $S_M$ and the secondary bi-directional switches (e.g., $S_{1a}/S_{1b}$ and $S_{2a}/S_{2b}$) is achieved. Each output may be soft-switched by sequentially sequencing each output with a single stroke of the primary. That is, the primary switch $S_M$ could be cycled once for each individual output.

CIRCUIT OPERATION

Figure 7A:
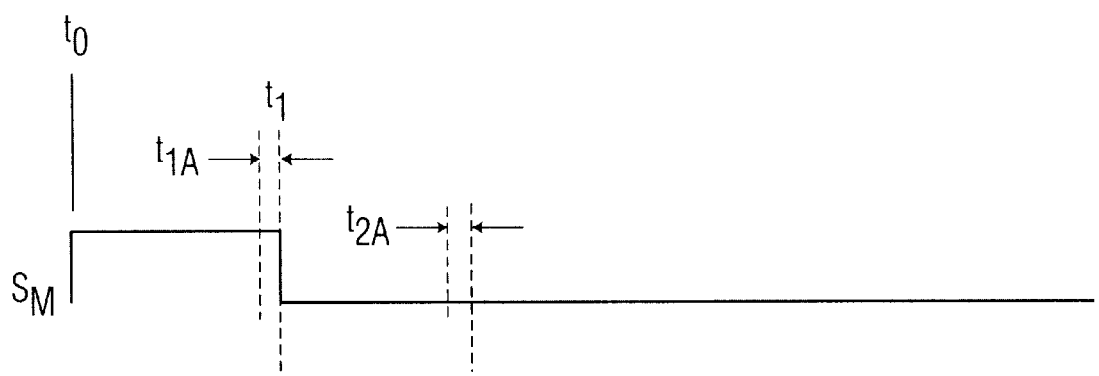
FIGS. 7A–7C illustrate idealized waveforms during a switching period of the soft-switched multiple-output flyback converter of FIG. 5.
Figure 7B:
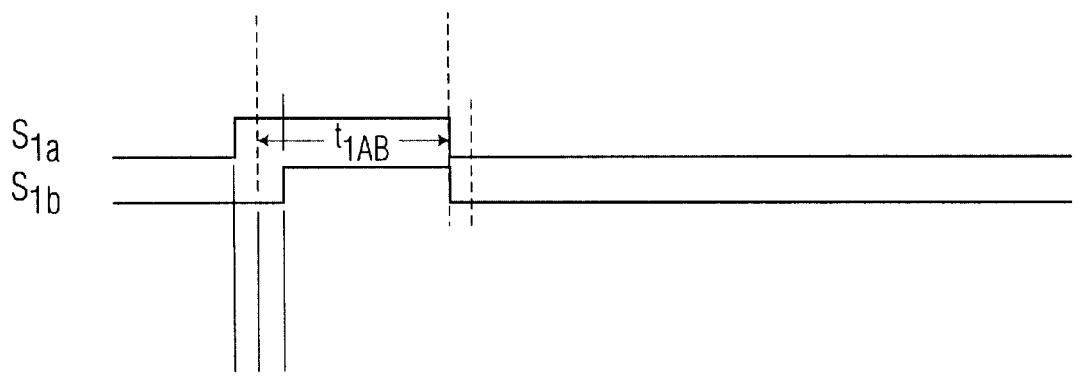
Figure 7C:
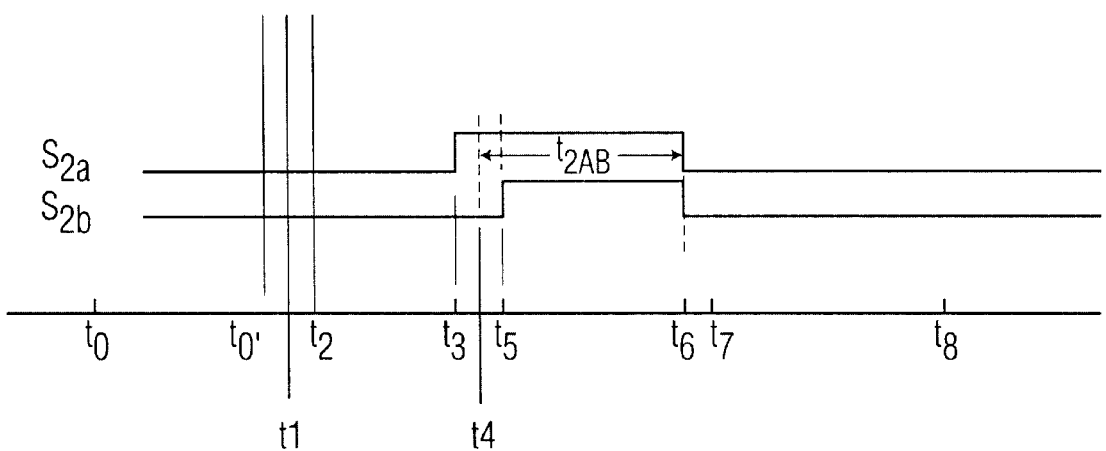

Operation of the inventive circuit 500 of FIG. 5 may be more readily understood with reference to the idealized switching circuit waveforms of FIGS. 7A–7C. FIGS. 7A–7C illustrate the open and closed states of the switches $\{S_M, S_{1a}, S_{1b}, S_{2a}, S_{2b}\}$ during one inductor charge/discharge cycle. In FIGS. 7A–7C, it is assumed that $V_1 < V_2$.

Referring first to FIGS. 7A and 7B, at time t0, switch $S_M$ is turned 'on'. Sometime prior to $S_M$ turning 'off' at time t1, switch $S_{1a}$ is turned 'on' at time $t_0'$. Since $V_{SEC}$ is negative while $S_M$ is 'on', the body diode $d_{1b}$ of switch $S_{1b}$ is reversed biased and blocks any current flow from the output $V_1$ in the direction of switch $S_{1a}$. When $S_M$ turns 'off' at time $t_1$, the voltage $V_{SEC}$ rises until the body diode $d_{1b}$ conducts during the time $t_{1A}$. Sometime after this time, at time $t_2$, switch $S_{1b}$ is turned 'on' so as to achieve a voltage drop of two RDSon (e.g., $S_{1a}$ and $S_{1b}$). During the entire time $t_{1AB}$ (See FIG. 7B), current is conducted to the $V_1$ output.

Referring now to FIGS. 7A and 7C, in a similar fashion, sometime prior to turning 'off' $S_{1a}$ and $S_{1b}$, $S_{2a}$ is turned 'on' at time $t_3$. Since it is assumed that $V_2 > V_1$, the body diode $d_{2b}$ of $S_{2b}$ will be reverse biased and current flow from $V_2$ to $V_1$ will be blocked. When $S_{1a}$ and $S_{1b}$ are turned 'off' at time $t_4$, the voltage $V_{SEC}$ will rise and the body diode $d_{2b}$ of $S_{2b}$ will conduct during time $t_{2A}$. As before, $S_{2b}$ can now be turned 'on'. This sequencing can continue for each successive output.

As shown, the sequencing permits turn-on soft-switching of the output switches. Given the alternate assumption that $V_1 > V_2$, then the turn-on times and the switch overlap would be altered. In this case, it would be possible to achieve turn-off soft-switching and body diode reverse recovery losses would increase.

SECOND EMBODIMENT

Figure 8:
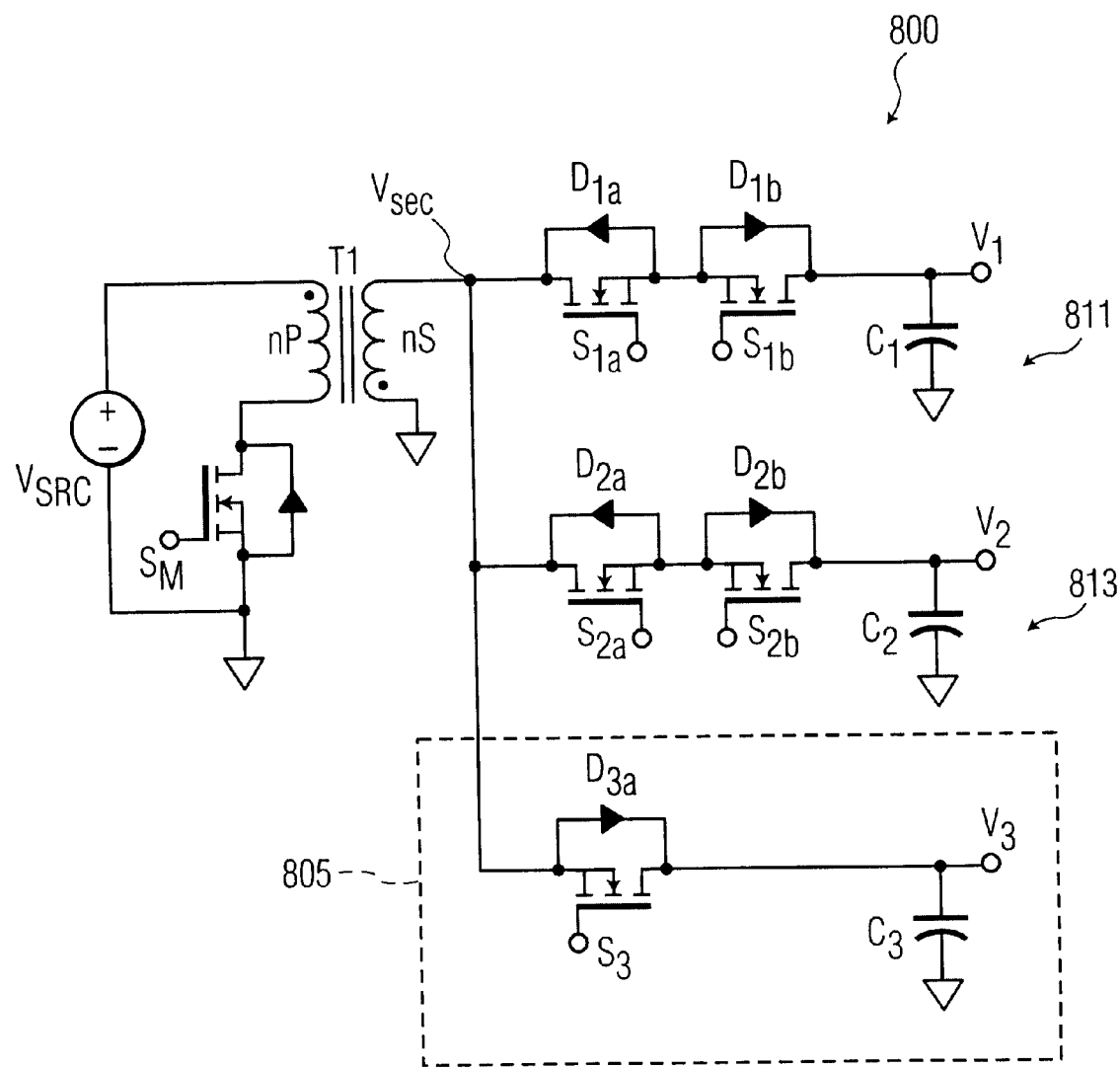
FIG. 8 illustrates a second embodiment of a circuit diagram of a soft-switching multiple-output flyback converter in accordance with the present invention.

FIG. 8 is a schematic diagram of a second illustrative embodiment of a soft-switching flyback converter circuit 800 of the present invention. The present embodiment illustrates a circuit which illustrates how the inventive circuit 800 can be combined with a portion (i.e., one output) of a conventional circuit of the prior art (i.e., FIG. 4). In particular, the inventive circuit 800 is shown to include output circuits 811 and 813. Output circuit 805 illustrates an output circuit in accordance with the prior art. Output circuit 805 illustrates a standard output circuit configuration including a single conventional switch $S_3$.

As previously described with reference to FIG. 4, prior art output circuit 805, by virtue of its conventional configuration, must be the last output to be sequenced or cycled in the cycling order. By contrast, those output circuits associated with the inventive circuit 800 (i.e., 811, 813) can be sequenced or cycled in any order in accordance with the principles of the present invention.

In sum, the present embodiment is provided to illustrate a hybrid circuit including a combination of prior art circuit topology with the circuit topology of the present invention.

APPLICATIONS

The re-configurability of the inventive circuit 500 of FIG. 5 finds particular use in the case of a CRT power supplies which find use in monitors and CRT televisions. These CRT power supplies typically include several outputs (e.g., 12V, 80V, and 180V). Under normal full-power operation, all these voltages would be active. Normal sequencing would probably be from low to high (e.g., 12V first followed by 80V then 180V) to more easily achieve soft switching. There would be some overlap in the switch operation. The last output, 180V in the present example, would operate in a bi-directional mode to achieve soft-switching of the primary. During power-down or sleep modes, it may be required that only the low voltage be maintained ON. That is, the 12V output would remain 'on', while the 80V and 180V outputs would be shut down. Recognizing that each output incorporates a bi-directional switch, it is therefore possible for the secondary side controller to transfer the bi-directional action (i.e., primary soft switching) to the 12V output.

It is further noted that for an application which requires that the output voltages be periodically changed, the output sequencing can be changed on-the-fly. This same capability would be available for lower voltage, higher current power supplies (e.g., power supplies for LCD monitors and personal computers). Depending upon the application, the 2X RDSon of the bi-directional switches may actually result in lower losses (i.e., lower forward voltage drop) than would be seen with a corresponding switch and low-voltage Shottky rectifier combination as is used in prior art.

Those skilled in the art will readily recognize that these and various other modifications, arrangements and methods can be made to the present invention without strictly following the exemplary applications illustrated and described herein, and without departing from the spirit and scope of the present invention.

What is claimed is:

1. A soft-switching flyback converter having a primary and secondary side for providing output cycling sequence control comprising:

a power transformer having at least a primary winding and a secondary winding;

an input circuit on said primary side for coupling an input DC voltage to said power transformer primary winding, said input circuit including a primary side switch; and a plurality of output channels on said secondary side coupled to said power transformer secondary winding, each of said plurality of output channels including secondary side bi-directional switching means connected to said power transformer secondary winding;

wherein each of said secondary side bi-directional switching means comprises a pair of sub-switches having corresponding body diodes, said sub-switches being arranged such that the corresponding body diodes are oppositely conductive, and wherein said secondary side bi-directional switching means associated with each of said plurality of output channels controls an output cycling sequence of said plurality of output channels irrespective of an output voltage of each of said plurality of output channels.

2. The flyback converter as claimed in claim 1, wherein said secondary side bi-directional switching means associated with each of said plurality of output channels controls said output cycling sequence via a control voltage for controlling an on/off state of each of said secondary bi-directional switching means.

3. The flyback converter as claimed in claim 1, wherein said secondary side bi-directional switching means enables soft-switching of said primary side switch.

4. The flyback converter as claimed in claim 1, wherein the primary side switch is a MOSFET transistor with an integral reverse diode.

5. The flyback converter as claimed in claim 1, wherein the primary side switch is a bipolar junction transistor with an integral reverse diode.

6. The flyback converter as claimed in claim 1, wherein each of the sub-switches and corresponding body diodes of the secondary side bi-directional switching means is a MOSFET transistor.

7. The flyback converter as claimed in claim 1, wherein each of the secondary side bi-directional switching means can be turned off thereby removing an associated output circuit which includes said secondary side bi-directional switching means from the cycling sequence.

8. A method for providing output cycling sequence control, said method comprising the steps of:

providing a power transformer having at least a primary winding and a secondary winding;

providing an input circuit on said primary side for coupling an input DC voltage to said power transformer primary winding, said input circuit including a primary side switch;

providing a plurality of output channels on said secondary side coupled to said power transformer secondary winding, each of said plurality of output channels including secondary side bi-directional switching means connected to said power transformer secondary winding, each of said bi-directional switching means comprising a pair of sub-switches having corresponding body diodes, said sub-switches being arranged such that the corresponding body diodes are oppositely conductive; and providing secondary side control means for controlling an output cycling sequence of said plurality of output channels irrespective of an output voltage of each of said plurality of output channels.

9. The method as claimed in claim 8, wherein said bi-directional switching means provides soft-switching of said primary side switch.

10. The method as claimed in claim 8, wherein said secondary side bi-directional switching means associated with each of said plurality of output channels controls said output cycling sequence via a control voltage for controlling an on/off state of each of said secondary bi-directional switching means.

11. The method as claimed in claim 8, wherein the primary side switch is a MOSFET transistor with an integral reverse diode.

12. The method as claimed in claim 8, wherein the primary side switch is a bipolar junction transistor with an integral reverse diode.

13. The method as claimed in claim 8, wherein each of sub-switches and corresponding body diodes of the secondary side bi-directional switching means is a MOSFET transistor.

14. The method as claimed in claim 8, wherein the secondary side bi-directional switching means can be turned off thereby removing an associated output circuit which includes said secondary side bi-directional switch from the cycling sequence.

* * * * *